W. PFARRER.
LAND ROLLER AND PULVERIZER.
APPLICATION FILED AUG. 12, 1907.

914,453.

Patented Mar. 9, 1909.
2 SHEETS—SHEET 1.

Witnesses:—

Inventor,
William Pfarrer,
by Harry D. Wallace
Att'y.

W. PFARRER.
LAND ROLLER AND PULVERIZER.
APPLICATION FILED AUG. 12, 1907.
914,453.
Patented Mar. 9, 1909.
2 SHEETS—SHEET 2.
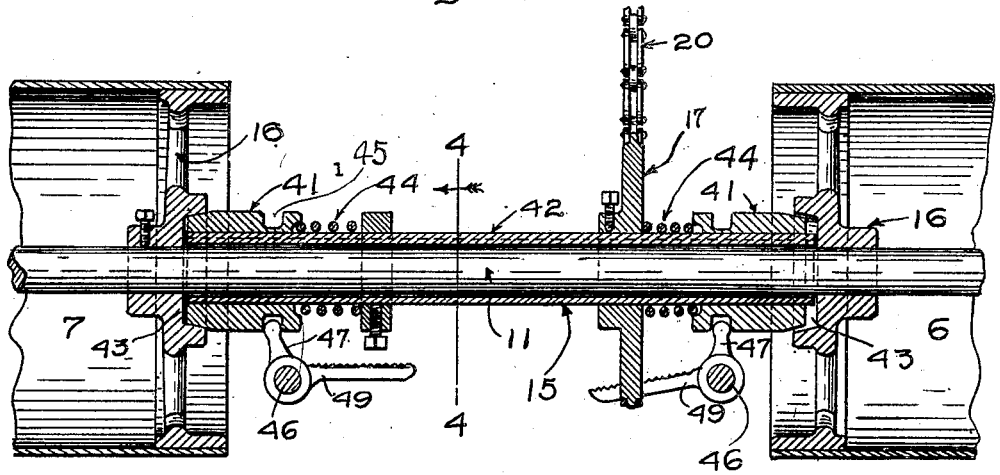
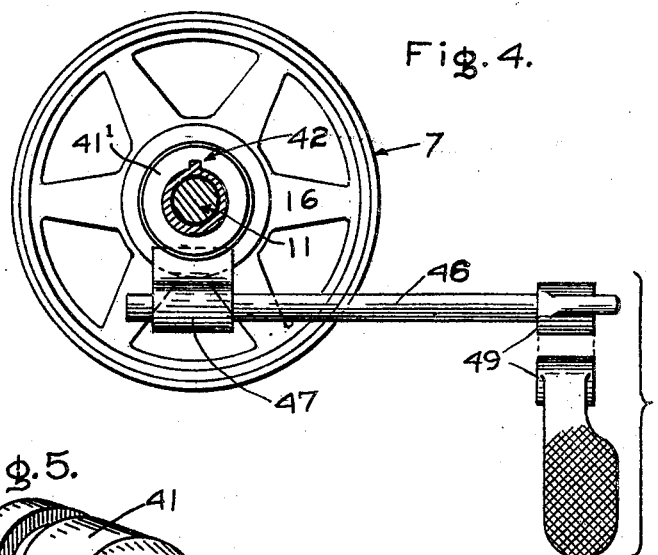
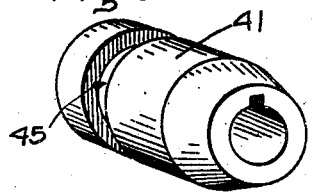
Witnesses.—
Inventor,
William Pfarrer,
by Harry De Wallace
Att'y.

UNITED STATES PATENT OFFICE.

WILLIAM PFARRER, OF SYRACUSE, NEW YORK.

LAND ROLLER AND PULVERIZER.

No. 914,453.  Specification of Letters Patent.  Patented March 9, 1909.

Application filed August 12, 1907. Serial No. 388,119.

*To all whom it may concern:*

Be it known that I, WILLIAM PFARRER, a citizen of the United States, residing at Syracuse, in the county of Onondaga and State of New York, have invented certain new and useful Improvements in Land Rollers and Pulverizers, of which the following is a specification.

This invention relates to improvements in combined land rollers and pulverizers, designed for use in connection with the tilling of the soil, and the invention relates particularly to an auto or self-propelled land roller with a pulverizer or harrow attached.

The object of the invention is to provide a simple, convenient, durable and inexpensive farming implement, for use in rolling and pulverizing the surface of cultivated soil after plowing, wherein the driving or operation of the machine is accomplished by means of an engine or a motor, which is carried by and forms a part of the machine, thus doing away with the employment of horses or other draft animals, and producing a tilling apparatus which may be driven at a higher speed than devices of this class have heretofore been operated, and a further object of the invention is to provide means for the driver or operator to ride upon and to direct and control the movements and operation of all of the working parts of said machine.

The invention consists principally of three hollow cylinders or drums, mounted in a suitable frame, and preferably arranged in tri-cycle order, with the central roller ahead and two rear rollers mounted on a common shaft supported by the frame.

The invention further consists in providing a motor or engine and mounting the same upon the frame, preferably between the two rear rollers.

The invention further consists in providing means for driving either or both of the rear rollers or drums through suitable connections with the motor or engine.

The invention further consists in providing simple means for steering the machine.

The invention further consists in adjustably connecting a pulverizer, harrow or other farm implement to the rear of the frame which supports the rollers.

Other features and parts of the invention will be understood from the detail description which follows, and by reference to the accompanying drawings, which form a part of this specification, and in which—

Figure 1:
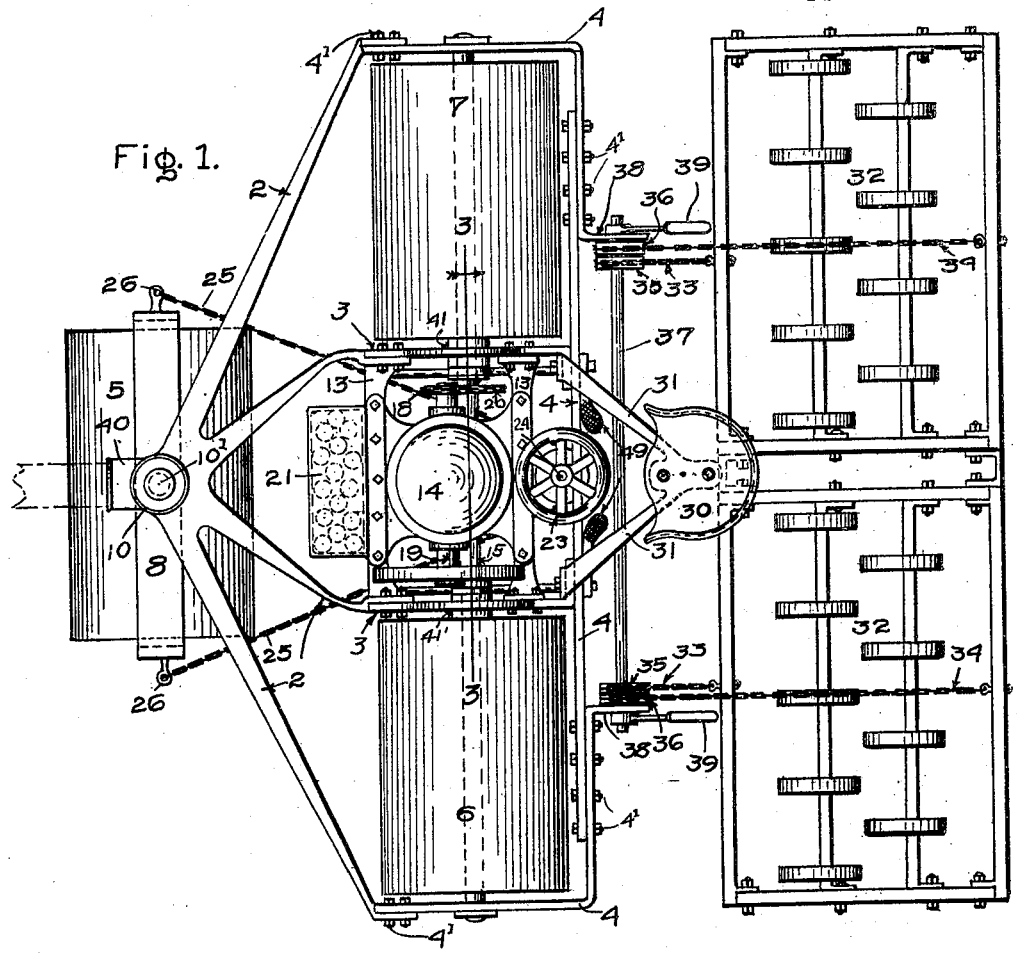
Figure 2:
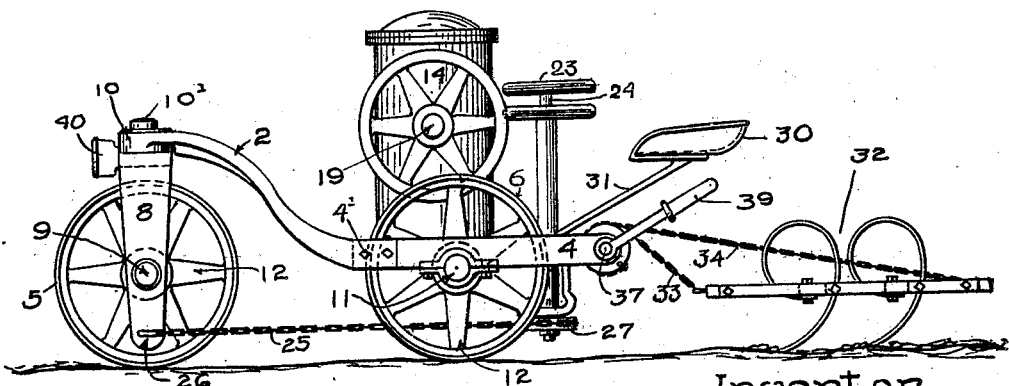

Figure 1 is a plan view of the complete machine, showing the disposition and arrangement of the principal parts embodying my invention. Fig. 2 is a side elevation of the complete machine. Fig. 3 is a longitudinal section substantially on the line 3—3 of Fig. 1, showing clutch parts and sleeve. Fig. 4 is a cross section substantially on the line 4—4 of Fig. 3, showing the clutch releasing mechanism. Fig. 5 is a perspective view of one of the clutches.

Similar characters of reference are assigned to corresponding parts throughout the several figures.

In the drawings, 2 represents the main or front section, 3 the middle section and 4 the rear section of the frame of my land roller. The several parts of the frame are rigidly secured together at the sides and back of the main machine, by a series of bolts 4'. All of the parts of the frame are preferably made of malleable metal either forged or cast, although wood of any suitable kind may be employed for the frame with good results.

5, 6 and 7 represent respectively the front and rear rollers or cylinders arranged in tri-cycle order, and preferably made out of steel tubing or cast hollow with walls of suitable thickness to produce the desired strength and weight for a land roller of the class. The rollers may also be constructed of wood of any suitable variety. The front roller 5 is preferably disposed in a yoke or fork 8, and is mounted loosely on a shaft 9, which is rigidly secured in the arms of the yoke. The yoke 8 is connected to frame 2 by means of a pivot or fifth wheel 10, which may partake of any suitable construction. A pin or bolt 10' holds these parts together and permits roller 5 to be partially rotated and steered or guided either to the right or left for the purpose of changing the direction of travel of the machine.

11 represents a shaft or like part supported by the frame section 4, upon which rear rollers or drums 6 and 7 are loosely mounted. It is preferred to have all of the rollers revolve on their respective shafts. Shafts 9 and 11 are preferably hollow and may be made from strong steel or iron tubing. The ends of shaft 11 are preferably made rigid in the frame, but they may be journaled if desired.

12, 12 represent spoked head-pieces tightly fitted in the outer ends of rollers 5, 6 and 7, their centers being formed into bearings for shafts 9 and 11.

13, 13 represent tie-bars or parts which connect the middle fork or section of the frame between the rolls 6 and 7 by means of bolts or rivets.

14 represents a motor or engine, preferably of the gasolene type, of sufficient horse-power to drive and operate the rolling machine and any trailing attachments connected thereto. The motor is preferably mounted securely upon the cross-bars 13 by means of suitable bolts.

15 represents a sleeve operably fitted to shaft 11 between the rollers 6 and 7 underneath the motor. This sleeve is provided with an integral spline 42, the purposes of which will be explained below. The motor 14 is intended to be of considerable horse-power, so as to insure the positive and rapid driving of my machine, and by that means a greater area of land may be rolled and pulverized in a given time, than where horses or other draft animals are employed.

16, 16 represent spoked head-pieces, preferably made of metal, fitted into the inner ends of rollers 6 and 7 facing the motor 14, and these parts are bored out centrally to receive and to form bearings for shaft 11.

17 represents a sprocket-wheel which is fitted rigidly to sleeve 15 by a set-screw or other securing means, and rotates with the sleeve on shaft 11.

18 represents a sprocket-wheel carried by the motor or intermediate connecting parts, such as a transmission-gear (not shown) and is disposed in line with sprocket 17.

19 represents the driving shaft of the motor upon which gear 18 is shown mounted. A sprocket-chain 20 forms the connection between the wheels 17 and 18. Any other suitable form of gearing may be employed for operatively connecting the motor to the rollers for driving the machine.

21 represents a box or case for carrying battery-cells usually employed for sparking an engine of the class, and this box is preferably supported by the front cross-bar 13.

23 is a steering-wheel secured to the upper end of a shaft 24, which may be mounted in any suitable manner upon the rear section of the frame 4.

25 represents a steering chain, the ends of which are attached to the arms of yoke 8, as at 26, the central portion of the chain passing partially around a toothed drum or sheave 27 mounted on shaft 24 beneath the frame.

30 represents a seat for the driver or machine tender, and may consist of any of the well-known harvester seats in common use. This seat is mounted upon a pair of strong legs or braces 31, which are suitably bolted to the rear frame or to cross-bar 13.

32 represents a pulverizer or harrow, which may partake of any of the forms of such implements employed for farming purposes, or instead of such a device being attached to the rolling machine, a seeder or planter may be substituted and operated in connection with the roller, if desired.

33, 33 are chains or like flexible parts for connecting the front ends of the pulverizer to the frame of the roller. One end of each of these chains is connected to the front end of a section of the trailing implement, the other ends being secured to drums or sheaves 35, which are mounted on a shaft or bar 37 carried by angular lugs 38 formed with the rear section of the frame.

34, 34 are chains for connecting the rear end of the harrow to drums or sheaves 36 also mounted on shaft 37. Chains 34 are for raising or adjusting the rear ends of the trailing implement.

39, 39 represent a pair of hand-levers connected in suitable manner with the drums 35 and 36, and these are employed for winding up or unwinding chains 33 and 34, for the purpose of adjusting the harrow and regulating the depth or lead of the teeth. The levers 39 are located so that they may be manipulated by the driver while sitting on seat 30. The seat is disposed in such manner that the driver may also control the motor and attend to the steering and other duties, without leaving it.

40 represents a socket formed in the front side of the yoke above roller 5, for use in attaching a tongue in case it is desired or necessary to draw the rolling machine with a team of horses.

41 and 41' represent cone-friction-clutches which are mounted on sleeve 15, and by means of the spline 42 they are rotatable with the sleeve. The clutches are slidable on sleeve 15 and are capable of being thrown into or out of connection or contact with corresponding cone-sockets 43 formed on the head-pieces 16 concentric with the bearings for shaft 11. The clutches are normally held in operative engagement with sockets 43 by coil springs 44 which surround sleeve 15, and exert their tension against the outer ends of the clutches.

45 represents a peripheral groove formed in each of the clutches.

46, 46 represent rocking-clutch-operating rods or shafts having upwardly projecting levers or cams 47 which are normally positioned in grooves 45. The rods 46 are mounted in suitable hanger-bearings not shown attached to the underside of the frame. The arrangement of these parts is such, that when shafts 46 are rocked by means of pedals or foot levers 49 attached to the rear ends of shafts 46, levers 47 will force the clutches out of engagement with sockets 43, and thus cut off the driving power from rollers 6 and 7. The foot levers 49 are disposed in position to be operated by the driver while he sits on seat 30, and as they are arranged independent of each other, he may depress with his feet either or both of the pedals 49 and thereby disconnect either or both of the clutches at the same time and at will. In this manner the rolling machine may be stopped very quickly, or the speed reduced in case such action becomes necessary. Any other suitable form of clutch or driving connections than the ones shown, may be employed, if desired. The providing of driving connections between the motor 14 and both of the rear rollers, renders the driving of the machine certain, as the tractive power of the two rollers traveling on an earthen course will be greater proportionally than the load and resistance of the combined machine.

In pulverizing or harrowing a field, it is desirable that the trailing machine be given a slight vibrating or oscillating movement laterally. To this end I provide the chains 33 in lengths which will permit the harrow to trail along a couple of feet or more behind the main machine, and dispose the forward end of the chains 33 about a foot and a half above the ground. In this way a straight pull on the harrow is avoided, and it will trail along in a zig-zag course, which will prevent it from gathering and carrying rubbish or rock along with it and make furrows in the field. This provision will also cause the teeth of the harrow to scratch and pulverize practically all of the surface instead of leaving narrow strips between the teeth undisturbed.

To operate my combined land roller and pulverizer, after the same has been assembled complete as described and shown, the driver will first mount seat 30, and see that the clutches 41 are disconnected from the rear rollers, then he will start the motor. After the motor is running satisfactorily, he may apply the power by or through the sprocket connections to the sleeve 15 and the clutches 41 and 41'. When this has been done, he will next release the clutches, preferably allowing them to enter the sockets 43 gradually, so as to start the rolling machine slowly at first. After he has gotten the machine in motion, he may throw the clutches into full release, which will allow springs 44 to force and tightly hold the clutches in the sockets and the roller will then travel at whatever speed the engine or motor has been set for driving it. Or, if a transmission-gear is employed in connection with the motor, the clutches may be left in engagement with their sockets, and he may start and stop the machine by operating said gear. As the machine moves over a field, the driver may guide or steer it by means of steering wheel 23 and chain 25. By the same means he may turn the machine at the end of the field and maneuver it for the return trip. In turning the machine, either to the right or left for recrossing a field, the driver may throw out the clutch which operates the inner or pivot roller, and let the motor drive the outer rear roller. In this manner the turning may be accomplished more readily than if the power were left applied to both rear rollers. The front roller 5 is preferably four or five inches longer than the rear rollers, and is disposed in such manner that each of its ends over-laps the inner ends of the rear rollers two or three inches. This provision is made so that when turning the machine, there will be no space or part of the surface of the field that will not be rolled. The rolling of plowed ground is usually done when the surface is dry, and when horses are used to draw the rollers, they turn up fresh moist earth with their feet at every step, some of which clings to the rollers, and for that reason scrapers formerly have been carried by such machines and frequently applied in order to keep the rollers clean and prevent increase in their weight and also smooth rolling.

By the employment of a motor to drive my rolling machine, the surface of a field ahead of the rolls is undisturbed, and the rollers will not gather any earth or mud. I am thus able to omit the scrapers and simplify my construction to that extent.

Heretofore, as far as I am aware, land rolling has been done solely by the use of horses or like draft animals for the drawing power, and this work has been regarded by farmers as the hardest service for such teams. It is a particular object of this invention, to do away with horses altogether in connection with land rolling, and to employ instead as motive power therefor a motor or engine of suitable size and strength to do such work more rapidly, more effectively and more economically than by the old methods referred to. As the rolling of land is often of less importance than many other forms of the work of tilling and cultivating the soil, such as pulverizing or breaking up the surface of the ground at short intervals, I have combined with my tri-roller machine and the motor for driving it, a harrow or other form of pulverizer, which is attached to the main frame so that it will be drawn along over the same stretch of ground which the rollers have covered. In this manner, after a field has been plowed, the rollers roll down and crush the clods and smooth the surface of the field, and the pulverizer following immediately after, stirs or breaks up the surface again to a slight depth, and leaves it in level condition, and at the same time disturbs and destroys the germs of grass and weeds, which may have sprouted since the plowing. By the employment of my improved machine, a farmer may roll and pulverize a field several times in a shorter period of time than it would be possible for him to do the same work by using horses. He can take my machine out and roll his land at night before an approaching storm, when his horses would not be able to stand such extra work. The motor 14 employed for driving my machine, being mounted upon a solid frame in the manner described and shown, it is obvious that instead of employing the rollers 5, 6 and 7 of the dimensions required for rolling the land, broad tired wheels or casters may be substituted, and the machine in such condition may be employed for hauling pulverizers or other farm machinery, at times when rolling of the land is not desirable.

It is obvious that some changes or modifications may be made in the parts of my device without departing from the spirit of the invention, and I therefore do not wish to restrict myself to the precise construction and arrangement as herein shown and described.

Having thus described my invention, what I claim as new and desire to secure by Letters Patent, is—

1. In an implement of the class described, the combination with a frame and a pivoted yoke connected thereto, of a single roller journaled in said yoke, a pair of rear rollers transversely journaled in said frame mounted on a hollow shaft and spaced apart approximately a distance equal to the length of said single roller, the said rollers being arranged in such manner that they will roll a strip of land substantially as wide as the combined length of the three rollers, a sleeve loosely mounted on said shaft adapted to connect with each of said rear rollers, a motor carried by said frame disposed between said pair of rollers, a train of sprocket-gears to connect said motor with said pair of rollers for the purpose of driving said implement, one of said sprocket-gears mounted on said sleeve adapted to rotate the same and effect the driving of either or both of said rear rollers, and a steering-gear mounted on rear of said frame to steer and control the lateral movement of said single roller, substantially as described.

2. An implement of the class described, comprising a frame, a yoke pivotally connected with said frame, a series of rollers arranged in tri-cycle order, one of said rollers journaled in said yoke and disposed in front, and two of said rollers transversely journaled on a hollow shaft mounted in the frame to the rear of said first roller, a sleeve loosely mounted on said shaft between said rear rollers, the opposite ends thereof adapted to connect with said rollers, an engine mounted upon the frame between said rear rollers, and operatively connected with said sleeve, and means for disconnecting said sleeve from one, or both of said rear rollers at the same time, substantially as described.

3. An implement of the class described, comprising a frame, a yoke pivotally connected to the front end of said frame, a single roller journaled in said yoke, a steering-gear to control the lateral movement of said single roller mounted on the rear of said frame, a pair of like rollers loosely mounted on a hollow shaft rigid in said frame rearwardly and one on each side of said single roller adapted to roll the outer edges of a strip of land while said single roller rolls the middle portion thereof, a sleeve disposed on said shaft between said pair of rollers adapted to operatively connect with the inner ends of said rollers, and an engine disposed between said pair of rollers and operatively connected to said sleeve adapted to operate said sleeve independently of both of said rollers, substantially as described.

4. In a combined implement of the class described, the combination with a frame and a yoke pivotally connected thereto, of a series of rollers arranged in tri-cycle order, one of said rollers journaled in said yoke and disposed in front, and two of said rollers journaled on a hollow shaft in the frame to the rear of said front roller, an engine mounted upon the frame between said rear rollers, a sleeve mounted on said shaft capable of being operatively connected to said rear rollers, a train of driving-gears to connect said engine with said sleeve for the purpose of driving said rear rollers, a rocking-shaft journaled to the rear of said frame, a harrow connected to said rocking-shaft, and a lever mounted on each end of said rocking-shaft adapted for adjusting said harrow to a number of different positions in relation to said frame, substantially as described.

5. An implement of the class described, comprising a frame, having a pivoted yoke at its front end, a single cylinder journaled in said yoke, a steering-gear mounted on the rear of said frame to control the lateral movement of said single cylinder, a pair of like cylinders loosely journaled on a rigid shaft in said frame rearwardly of said single cylinder adapted to roll the outer edges of a strip of land while said single cylinder rolls the middle portion thereof, a motor carried by said frame disposed between said pair of cylinders, a train of driving-connections comprising sprocket-gears and a sleeve carried by said shaft through which the power of said motor may be transmitted to either or both of said rear cylinders, a rocking-shaft journaled to the rear of said frame, a pulverizer connected to said rocking-shaft, and a lever mounted on each end of said rocking-shaft adapted for adjusting said pulverizer to a number of different positions in relation to said frame.

6. A combined land roller and pulverizer, comprising a frame supporting three rollers arranged in tri-cycle order, one of said rollers disposed in front, and two rear rollers mounted on a hollow shaft made rigid in said frame, a sleeve rotatably mounted on said shaft between said rear rollers adapted to be operatively connected to the inner ends of said rear rollers, a sprocket-wheel rigidly mounted on said sleeve, a motor mounted between said rear rollers, a sprocket-wheel carried by said motor, a chain connecting said sprocket-wheels for the purpose of driving said sleeve, means for disconnecting one or both of said rollers from said sleeve, a rocking-shaft journaled to the rear of said frame, a harrow connected to said rocking-shaft, and a lever connected to each end of said rocking-shaft adapted for adjusting said harrow to different positions in relation to said frame, substantially as described.

In testimony whereof I affix my signature in presence of two witnesses.

WILLIAM PFARRER.

Witnesses:
FRANCIS A. CANFIELD,
HARRY DE WALLACE.